United States Patent [19]

Soderbaum

[11] Patent Number: 4,708,357
[45] Date of Patent: Nov. 24, 1987

[54] ADAPTOR HANDLE

[75] Inventor: Mavis Soderbaum, Prospect, Australia

[73] Assignees: Gerard Berkowitz, Australia; Jeffrey Stewart, Laguna Hills, Calif. ; a part interest

[21] Appl. No.: 846,304

[22] Filed: Mar. 31, 1986

[51] Int. Cl.⁴ .............................................. B62B 3/00
[52] U.S. Cl. ............................. 280/289 H; 16/114 R; 269/228
[58] Field of Search ......... 269/228; 292/66, DIG. 49; 16/40, 41, 114 R; 24/490, 514; 280/47.37 R, 289 H, 47.31, 655

[56] References Cited

U.S. PATENT DOCUMENTS

| | | | |
|---|---|---|---|
| 2,600,584 | 6/1952 | Snell | 269/228 X |
| 2,619,138 | 11/1952 | Marler | 24/490 X |
| 2,816,775 | 12/1957 | Costello | 280/289 H |
| 3,336,048 | 8/1967 | Papucki | 280/289 H |
| 3,503,276 | 3/1970 | Vigot | 280/47.37 R |
| 3,971,552 | 7/1976 | Mayfield | 269/228 |
| 4,056,268 | 11/1977 | Connor et al. | 280/289 R X |

OTHER PUBLICATIONS

*Hunt-Wilde* Corp. Bicycle "Motor X".

Primary Examiner—John J. Love
Assistant Examiner—Michael Mar
Attorney, Agent, or Firm—Stetina and Brunda

[57] ABSTRACT

An adaptor handle for use on wheeled vehicles having two spaced apart handles for application of propulsion forces and steering is characterized by (i) an arm extending in use between the spaced apart handles of the wheeled vehicle (ii) a clamp adjacent each handle end to enable the with arm to be coupled onto the spaced apart handles, and (iii) a single hand grip extending substantially from the center of the arm.

9 Claims, 5 Drawing Figures

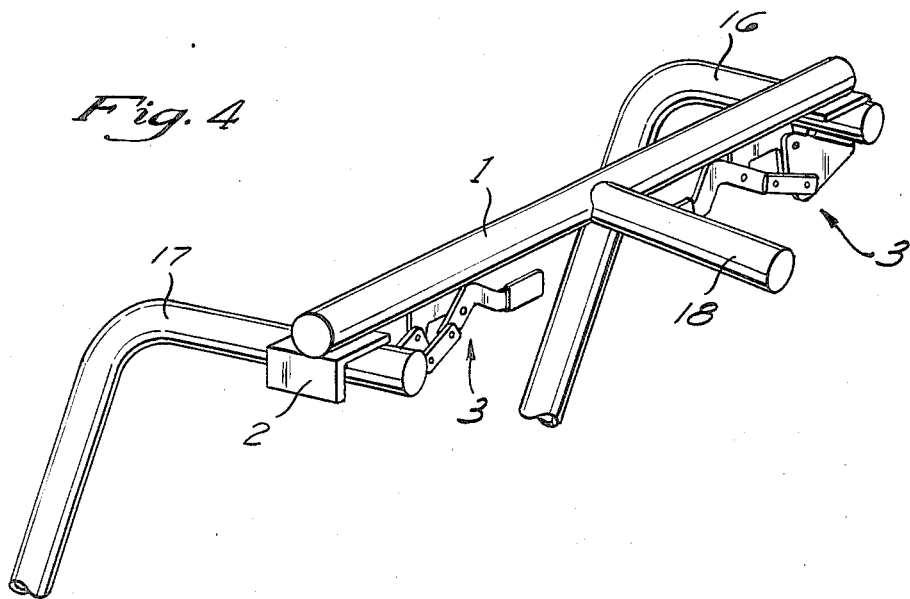
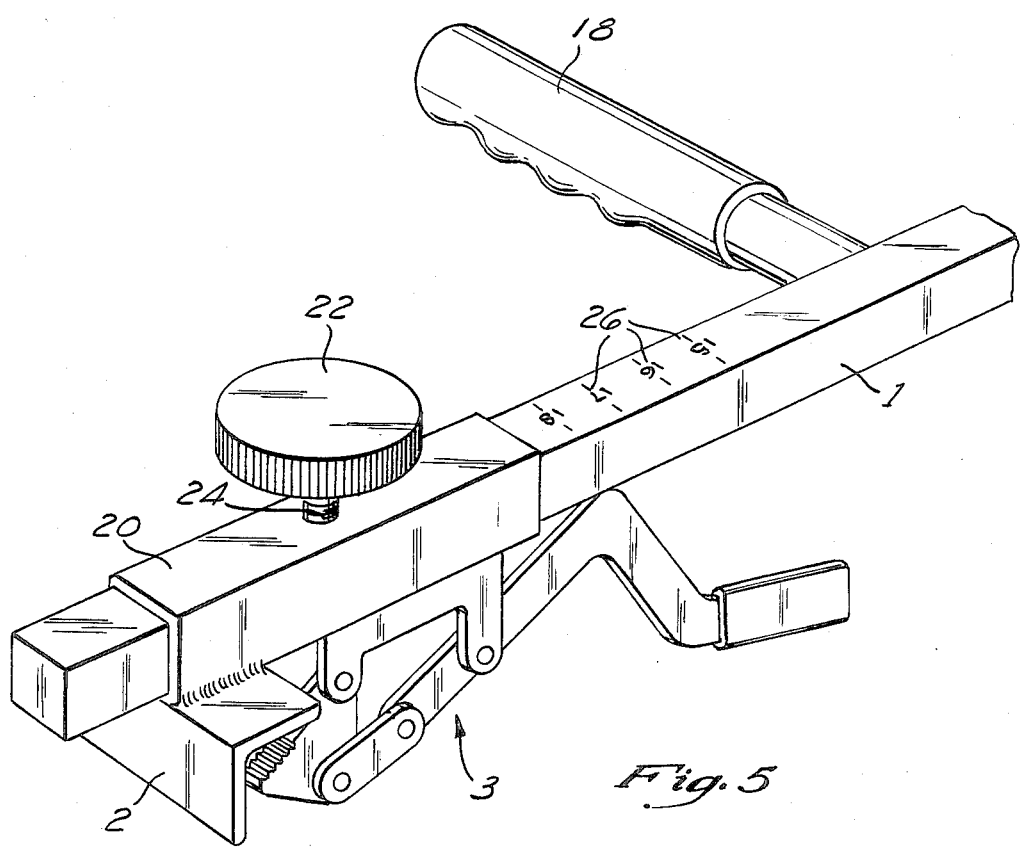

ADAPTOR HANDLE

BACKGROUND OF THE INVENTION

The present invention relates to adaptor handles for wheeled vehicles and, more particularly, to wheeled vehicles of the type propelled by hand.

Wheeled vehicles of the type to be considered with this invention include wheelchairs, perambulators or baby carriages, supermarket trolleys, shopping carts and the like but the invention is not restricted to application to these devices but may be applied to general devices of the type discussed below.

The type of wheeled vehicle particularly to which this invention is directed is that type having two spaced apart handles extending from the wheeled vehicle and adapted to enable the wheeled vehicle to be pushed along utilizing those hands to apply propulsion.

A problem exists however, that if a person has only one hand free to propel such a wheeled vehicle, then pushing on one handle or the other makes the device very difficult to propel and particularly to steer and in places such as supermarket aisles and crowded streets causing considerable damage by mis-steering.

SUMMARY OF THE PRESENT INVENTION

The present invention will be particularly described in relation to its application to wheelchairs but as described above, it is not restricted thereto and may be applied to any type of wheeled vehicle having a pair of propulsion and steering handles.

The subject Applicant has found that if a single handle is placed in a central position for one handed propulsion then very efficient steering and control can be achieved. In one form therefore, although this may not necessarily be the only or the broadest form, the invention may be said to reside in an adaptor handle, adapted for use on wheeled vehicles having two spaced apart handles for application of propulsion forces and steering purposes, the adaptor handle characterised by an arm extending in use between the spaced apart handle of the wheeled vehicle and having clamp means at each end thereof to enable it to be coupled onto the spaced apart handles and a single hand grip extending substantially from the center of the arm.

It will be seen that by the present invention, a clamp means is provided to clamp onto the existing handles and then a single hand grip is provided in the center between the existing handles so that propulsion and steering forces may be applied evenly or as required for steering.

The clamp means for the adaptor handle to lock onto the existing handles may be provided by a clamp bar having a wing nut and a threaded bolt to clamp the clamp bar against the arm with the existing handle therebetween on each end of the arm and by selective positioning of the clamp bar and arm this additional handle may remain in position or may be adapted to be removable when it is not required.

Alternatively, the adaptor handle may be clamped to the existing handles by means of an over-center locking arrangement or a quick engage release catch. An over-center locking arrangement utilizes a series of short lever arms and the natural resiliency of the materials of construction so that in engaging the clamp means the short lever arms may be set in such a position that to be released a high force step must first be required to overcome a resisting force. By this means, the catch can be very easily engaged and released.

As pointed out above, however, the clamp means is not restricted to an over-center locking means or a clamp bar but may use any other convenient form of clamping. Such a clamping means may be a permanent fixture, bolted through the handle of the wheelchair or other wheeled vehicle so that at all times the third handle is available or as indicated above, it may be removable for storage in any convenient place. In the case of a removable handles, storage may be conveniently achieved by hanging the handle from one or other of the handles and applying the clamp means when in the hanging position to store the handle thereby.

In a further form, the invention may be said to reside in a wheeled vehicle of a type including two spaced apart handles for the application of propulsion forces and steering purposes including an adaptor handle characterised by an arm extending in use between the spaced apart handles of the wheeled vehicles and having clamp means at each end thereof to clamp it to the spaced apart handles and a single hand grip extending from the arm substantially at the center of the arm between the end.

DESCRIPTION OF THE DRAWINGS

To more clearly assist with understanding of this invention, reference will now be made to the accompanying illustrations which show one preferred form of the invention although it is to be realized that other forms of the invention are within the scope of this patent.

FIG. 4 depicts a general perspective view of an adaptor handle according to this invention mounted on the pair of handles of a wheeled vehicle; and FIG. 5 depicts an additional embodiment of the adaptor handle of the present invention wherein the quick release catch is mounted to a reciprocating member.

DETAILED DESCRIPTION OF THE PREFERRED EMBODIMENT

Figure 1:
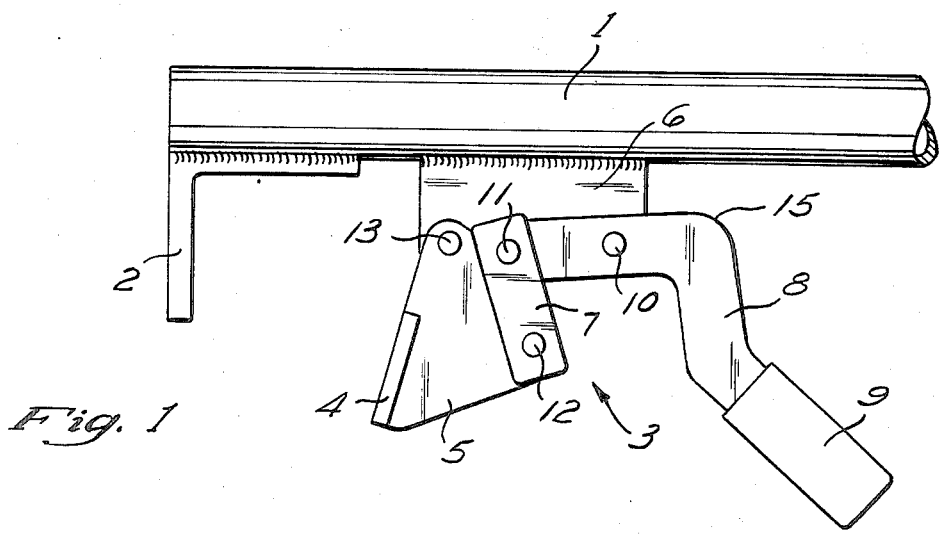
FIG. 1 depicts a quick release handle on one end of an adaptor handle with the quick release catch in the open position.

Now looking more closely at the drawings, it will be seen that the adaptor handle includes an arm 1 having a right angled plate 2 welded to one end of the arm and a quick release catch mechanism designated generally by the numeral 3.

The quick release catch mechanism 3 comprises a clamp plate 4 mounted on a trinangular plate 5. The triangular plate 5 is pivoted to a bracket 6, welded to the arm 1 and also has a link 7 pivotally mounted thereto. The link 7 at its other end is pivotally mounted to an engaging handle 8 which in turn is also pivoted to the bracket 6.

In use the hand grip 9 of the engaging handle 8 is pulled toward the arm 1 which pivots the engaging handle 8 about pivot point 10 on the bracket 6 which in turn pushes line 7 about pivot point 11 and pivot point 12 on the triangular plate 5, such that triangular plate 5 pivots about pivot point 13 so that the engaging plate 4 engages against the handle 14 of a wheeled vehicle.

Figure 2:
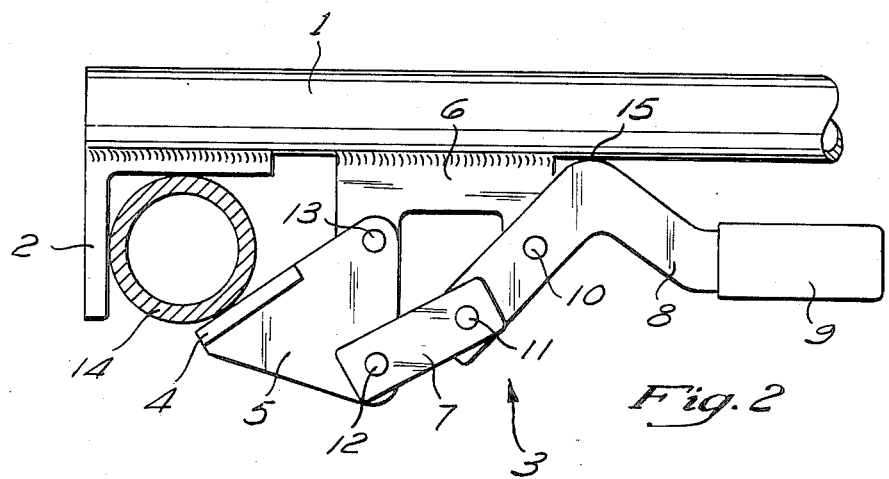
FIG. 2 depicts the quick release catch engaged against a handle of a wheeled vehicle.

It will be noted from FIG. 2 in comparison to FIG. 1 that the pivot point 11 is lower than a straight line between pivot points 10 and 12, whereas in FIG. 1 before the adaptor handle has been engaged against a handle 14, the pivot point 11 is on the opposite side of the line between pivot point 10 and pivot point 12.

At the moment when plate 4 engages against handle 14 and the pivot point 11 is displaced to the lower side of the line between pivot points 12 and 10, the abutment 15 on the engaging handle 8 abuts against the arm 1 thereby providing a stop. It will be noted from FIG. 2 that force on the engaging plate 4 away from the handle 14 will not disengage the quick release mechanism as this would cause the abutment 15 to come into stronger engagement with the arm 1 and this will normally not occur and hence, engagement can only be achieved if the pivot point 11 is moved to the upper side of the line between the pivot points 10 and 12. This is normally achieved by bearing down on the handle 9 with sufficient force to overcome the force step be general resiliency in the system to enable the over-center locking arrangement to be disengaged.

In one preferred form of the invention, the handle 14 may include a resilient surface so that the resiliency in the system to enable the handle to be disengaged will be reached when the handle 9 is depressed by the plate 4, depressing slightly into the handle 14.

Figure 3:
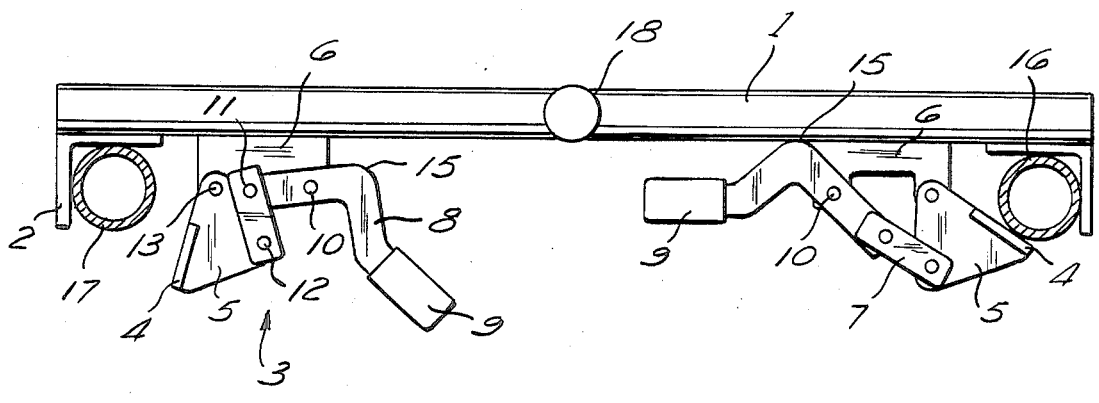
FIG. 3 depicts a complete view of a quick release catch according to this invention with one handle engaged and the other not engaged.

As can be seen in FIG. 3, the adaptor handle 1 includes a quick release mechanism 3 adjacent each end thereof with one quick release mechanism shown engaged against handle 16 but the other end not engaged against handle 17.

Midway between the ends of the arm 1 extends the single hand grip 18.

FIG. 4 shows the same general view as FIG. 3 but in perspective view and it will be seen that the handle extends substantially at the same angle as the existing pair of handles on the wheeled vehicle but it is to be realized that in some circumstances it may be desirable for the handle to extend at some other angles such as vertically up or if the handles of the wheeled vehicle extend not substantially rearwards then it may be desirable to have the single handle on the adaptor handle extending at some other angle.

In FIG. 5 an additional embodiment of the handle adaptor of the present invention is disclosed which permits the handle adaptor to accommodate differing widths in the handle spacing of the wheeled vehicle. The arm 1 in this embodiment is preferably formed having a rectanguar cross-sectional configuration and slidingly receives a carriage 20 at opposite ends thereof. The cross-sectional configuration of the carriage 20 is complimentary to the arm 1 such that the carriage may axially reciprocate along the length of the arm 1. The quick release catch mechanism 3 as well as the right angle plate 2 is rigidly mounted to one side of the carriage to be carried thereon. A releasable clamp 22 is provided on the opposite side of the carriage which in the preferred embodiment comprises a threaded handwheel fastener which engages a threaded aperture 24 extending through the outer wall of the carriage 20.

As will be recognized in use, the handwheel fastener 22 may be threaded outwardly a short distance within the aperture 24 whereby the carriage 20 may be freely reciprocated axially along the length of the arm 2. When the right angle plate abuts the handle of the wheeled vehicle, the handwheel 22 may be manually tightened to control the arm 1 and securely lock or clamp the carriage at a desired axial position upon the arm. To aid in this positioning of the carriage, the arm 1 may be provided with indicia 26 graduated in standard distance measurements representing the overall width between the right angled plates 2. Subsequently the quick release mechanism 3 may be manipulated in the manner previously described to clamp the adaptor handle to the handles of the wheeled vehicle.

Throughout this specification various indications have been given as to the scope of this invention, but the invention is not limited to any one of these and may be further modified without department from the scope of the present invention. The examples given are for illustration only and not for limitation.

What is claimed is:

1. An improved adaptor handle for wheeled vehicles and the like having a pair of handlebars with a pair of spaced apart rearwardly extending handles formed thereon for application of propulsion forces and steering comprising:

an arm member extending directly across said pair of spaced apart handles of the vehicle;

quick-release clamp means, mounted adjacent opposite ends of said arm member, for releasably clamping by hand-generated squeezing pressure said arm member to said pair of handles of the vehicle; and a single hand grip member, centrally mounted to the arm member and extending rearwardly from said arm member in a direction substantially parallel to and at the same level with said the pair of handles and adapted to be grasped by the hand of a user.

2. The adaptor handle of claim 1 wherein said clamp means comprises:

a right-angled plate, permanently affixed at each end of said arm member, for accepting an associated one of said pair of handles into and along the interior right angle corner of the plate; and a catch mechanism, mounted adjacent each opposite end of said arm member for releasably clamping each end of said arm member to an associated one of said pair of handles of the vehicle by forcing from hand-generated squeezing pressure each one of said pair of handles to and against its associated right-angled plate until a mechanical detent position is assumed, each handle thereafter held firmly against its associated right-angled plate without further continuance of squeezing pressure.

3. The adaptor handle of claim 2 wherein said catch mechanism comprises an over-center locking clamp.

4. The adaptor handle of claim 2 wherein said catch mechanism comprises a quick engage release catch.

5. The adaptor handle of claim 2 wherein said catch mechanism is coupled to a carriage reciprocally mounted upon said arm member.

6. The adaptor handle of claim 5 further comprising means for releasably locking said carriage at a desired axial position along the length of said arm member.

7. The adaptor handle of claim 6 wherein said releasably locking means comprises a threaded handwheel extensible through said carriage to contact said arm member.

8. The adaptor handle of claim 7 wherein said arm member and said carriage are formed having complimentary cross-sectional configurations.

9. In an adaptor handle apparatus for wheeled vehicles and the like having a pair of spaced-apart rearwardly extending handles at the end of handlebars for application of propulsion and steering forces, the adaptor handle apparatus having
attachment means for affixing to the handles, and
force transmission means, affixed to the attachment means, for allowing the propulsion and steering forces to be transmitted to the handles,
an improvement wherein the attachment means comprises:
a rigid fixed-length arm member extending directly between the handles, and
a quick-release clamp, mounted at each end of the arm member, which releasably clamps the adjacent handle by application of only hand-generated pressure and
wherein the force transmission means comprises:
a single substantially linear handle member affixed to the arm member at a position centrally between the handles and extending rearwardly from said arm member in a direction substantially parallel to and at the same level with said pair of handles.

* * * * *